US008792906B2

(12) United States Patent
Batada et al.

(10) Patent No.: US 8,792,906 B2
(45) Date of Patent: Jul. 29, 2014

(54) PROVIDING DERIVED LOCATION INFORMATION FOR CUSTOMER RELATIONSHIP IN RESPONSE TO RECEIPT OF SHORT RANGE WIRELESS BEACON

(75) Inventors: Asif Nooruddin Batada, Marietta, GA (US); Humphrey D. Chen, Palisades Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 28 days.

(21) Appl. No.: 13/454,872

(22) Filed: Apr. 24, 2012

(65) Prior Publication Data

US 2013/0281084 A1 Oct. 24, 2013

(51) Int. Cl.
*H04W 24/00* (2009.01)

(52) U.S. Cl.
USPC .................. 455/456.1; 455/456.2; 455/456.3; 455/457; 455/426.1; 455/426.2

(58) Field of Classification Search
USPC ............. 455/444, 456.1, 456.2, 456.3, 550.1
See application file for complete search history.

(56) References Cited

U.S. PATENT DOCUMENTS

| | | | |
|---|---|---|---|
| 8,028,903 B1 * | 10/2011 | Daniel | 235/380 |
| 2009/0052395 A1 | 2/2009 | Bao et al. | |
| 2009/0061821 A1 | 3/2009 | Chen et al. | |
| 2009/0061873 A1 | 3/2009 | Bao et al. | |
| 2010/0291949 A1 * | 11/2010 | Shapira et al. | 455/456.1 |
| 2011/0028093 A1 | 2/2011 | Patel et al. | |
| 2011/0244843 A1 * | 10/2011 | Shostak | 455/417 |
| 2012/0053833 A1 | 3/2012 | Kolodziej | |
| 2012/0053966 A1 | 3/2012 | Kolodzie | |
| 2012/0054032 A1 | 3/2012 | Kolodzie | |
| 2013/0065604 A1 * | 3/2013 | Werner et al. | 455/456.1 |

* cited by examiner

*Primary Examiner* — Kathy Wang-Hurst (57) ABSTRACT

A mobile station is configured to detect entry into a premises of an enterprise in response to short range or near field radio-frequency signals. The mobile station receives signals from one or more short range wireless beacons located in the premises, and the mobile station sends identifiers from the beacon signals to a location server. The location server processes the identifiers to determine location of the mobile station within the premises and sends information to the mobile station, for presentation to the user of a map of the premises showing the determined location of the mobile station within the premises. Entry detection also may be used to automatically check-in a customer/user of the mobile station with a system of the enterprise used by personnel of the enterprise at the premises to enable the personnel to customize interactions the customer while the customer is at the premises.

21 Claims, 5 Drawing Sheets

ADV_IND: Advertisement of Individual (Beaconing on 3 advertisement ch)

PROVIDING DERIVED LOCATION INFORMATION FOR CUSTOMER RELATIONSHIP IN RESPONSE TO RECEIPT OF SHORT RANGE WIRELESS BEACON

BACKGROUND

In recent years, customer service personnel have found that providing a customer with a satisfactory experience in an establishment is increasingly difficult. Competition with other stores, on-line shopping options, and the need for measures to reduce labor costs result in the need for an establishment, such as a commercial enterprise, to find an effective and novel way of providing a memorable and positive experience to a customer.

Hence a need exists for an enhanced interaction with a customer to ensure continued patronage of the commercial enterprise.

Some establishments personalize the customer experience by having the customers check-in upon entry. However, this typically involves manual inputs. For example, the user may need to run a loyalty card over or through an appropriate reader. Other approaches require the user or store personnel to enter identification data for the customer. Check-in theoretically might be automated in response to location detection, for example, using position as determined from global positioning satellite (GPS) signals. However, GPS location determination may not be effective for some commercial enterprises, such as stores in an enclosed mall, where GPS signals may be blocked by building structures.

Generally, department stores and the like have maps to assist customers in finding the desired section of the premises in which they wish to shop. However, these maps are usually not interactive, and if a customer needs to view the map again having walked away from it, the customer is required to walk back to the map and begin again. GPS type automated navigation has become quite common and popular, including for pedestrians. As noted, however, GPS signals may be blocked by building structures; and as a result, GPS based navigation may be ineffective within the buildings of many enterprises.

Therefore, a need exists to provide an easier and more customer-friendly experience for a customer when visiting an establishment or other enterprise.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

A mobile station and a system for communication with the mobile station are configured to enable an enterprise to offer features that may enhance customer experience when a user of the mobile station enters and/or moves about within a premises of the enterprise.

The mobile station has a wireless transceiver configured to enable mobile communications via a public macro cellular communication network as well as at least one wireless receiver configured to receive wireless signals over a range less than a range of wireless signals from the public macro cellular communication network. Examples of wireless signals of a range less than a range of wireless signals from the public macro cellular communication network, include short range signals, such as Bluetooth® (BT) or WiFi®, as well as near field radio-frequency (RF) communications signals such as used for radio-frequency identification (RFID) and/or Early Alert System (EAS) communications in retail establishments, which are well known in the industry. The mobile station is configured to detect entry into the enterprise premises in response to a signal corresponding to the enterprise received via the at least one wireless receiver. Examples are discussed in which the mobile station may detect entry in response to an identifier in short range signals, such as Bluetooth® or WiFi® signals from access points or other beacons in the premises, or in near RF signals, such as RFID query/scanner signals in the vicinity of an entrance of the premises.

In some examples, entry detection is used to automatically check-in a customer/user of the station with a system of the enterprise, e.g. to facilitate interaction of enterprise personnel with user while within the premises. The entry detection also activates programming in the mobile station to enable that station to communication with a location server of the enterprise, for location tracking.

The mobile station receives signals from one or more short range wireless beacon transmitters located in the premises, and the mobile station sends identifiers from the beacon signals to a location server. The location server has access to a mapping database that maps combinations of identifiers (and possibly measured signal strengths) to locations within the premises. Using information in the database, the location server processes the identifiers to determine location of the mobile station within the premises and sends back information regarding a map data for the premises, which the mobile station presents to the user to show the user's current location within the premises.

By way of a high level example, a system for communication with the mobile station may include a number short range wireless beacons, for example, Bluetooth® or WiFi® access points that emit beacon signals within the enterprise premises, where each emitted beacon signal includes an identifier associated with a respective one of the short range wireless transmitter. The system would also include a database mapping combinations of the identifiers (and possibly signal strengths) to locations within the enterprise premises. The server computer system is configured to receive, from the mobile station, a set of identifiers of short range wireless beacon signals received by the mobile station. In response, the server computer system determines, from the database, a location of the mobile station within the premises based on the received set of identifiers. The server computer system sends information to the mobile station, for presentation to the user of a map of the premises showing the determined location of the mobile station within the premises.

The mobile station and the server computer system may be configured to periodically update the map display as the user moves about the premises. In such a case, the mobile station will be configured to periodically collect and send identifiers from the short range wireless beacon signals, and the server computer system will again determine location and send information for the map presentation. In an example discussed below, the mobile station may also include a Micro Electromagnetic Systems (MEMS) including barometer and temperature sensors which are responsive to displacement as well as environmental factors. Although presently MEMS cannot detect movement in the vertical direction, the use of a barometric sensor in the mobile station enables tracking changes in elevation and vertical motion detection. Moreover, as MEMS are sensitive to temperature and pressure, the use of a temperature sensor (with or without using a barometric sensor) in the mobile station allows the mobile station to detect changes in temperature and calculate errors caused by temperature variation and correction values for MEMS. Thus, the mobile station may be able to accurately track movements over a long distance without using BT or WiFi beacons to aid in recalibration.

The mobile station updates the location shown on the presentation of the map in response to movement of the mobile station detected by the one or more MEMS, in between updates based on beacon identifiers. As noted, the mobile station and the server computer system periodically communicate to update the location and map presentation based on the beacon identifiers, which effectively enable to the mobile station to recalibrate the position within the premises shown on the map presentation.

The mobile station may detect entry to the premises in response to an identifier in one of the short range wireless beacon signals. Another approach relies on use of a near field radio-frequency signal at the entrance to the premises. For this later approach, the premises system may include an EAS configured to transmit a near field RFID query signal prompting the mobile station in the vicinity of an entrance to the premises to send back its identifier. The identifier can be International Mobile Subscriber Identity (IMSI) or Mobile Equipment Identifiers (MEID). The EAS system, on receiving the identifier from the mobile station, would forward to the store's Customer Relationship Management Server (CRM) system and tag it as a customer who has entered the store premises.

The system programming may also configure the server computer system to receive, from the mobile station, information associated with a customer using the mobile station, as a check-in with the enterprise to enable personnel of the enterprise at the premises to interact with the customer while the customer is at the premises.

Figure 1:
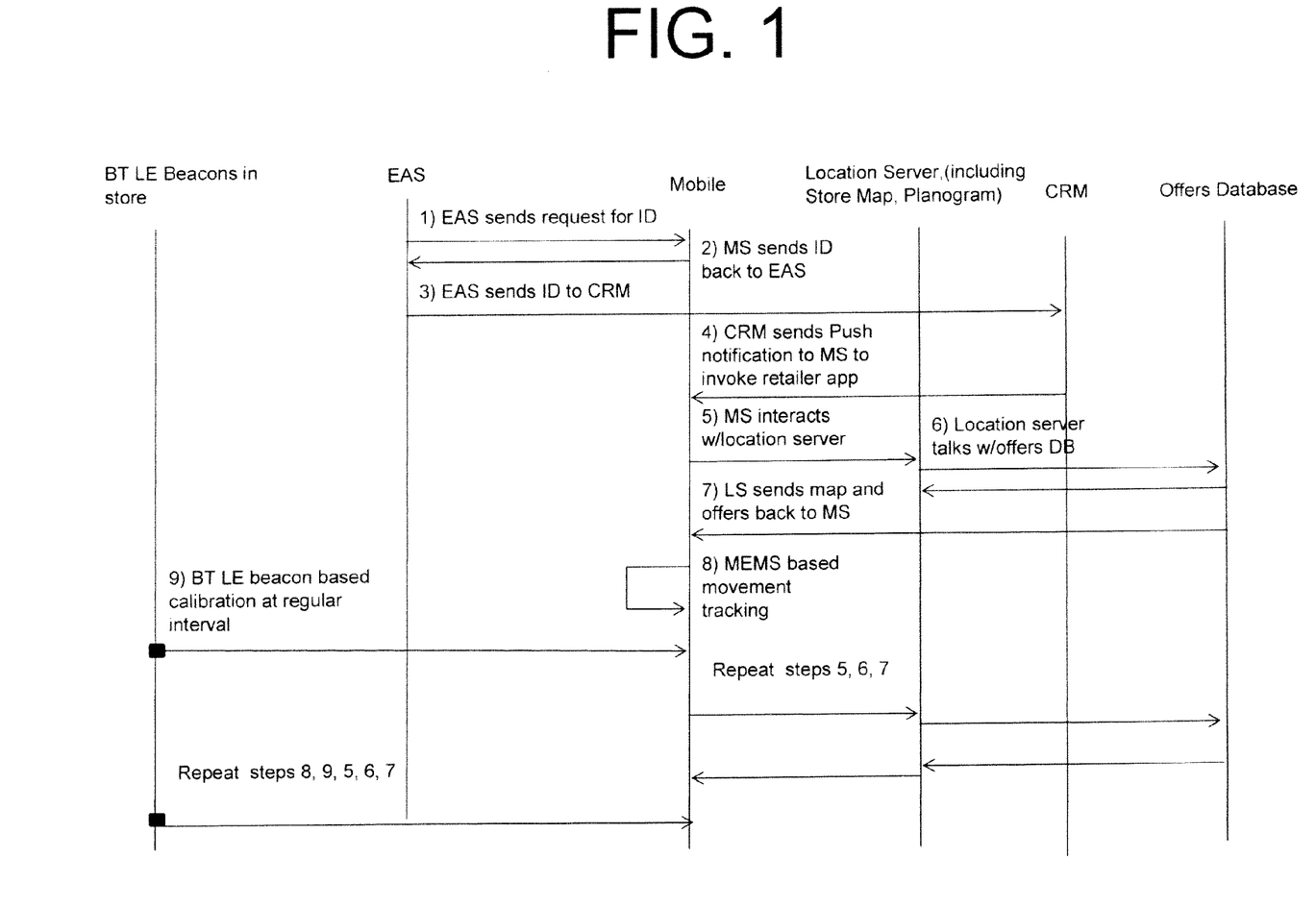
FIG. 1 is a flowchart of an exemplary method for presenting a customized communication experience in an establishment.
Figure 2:
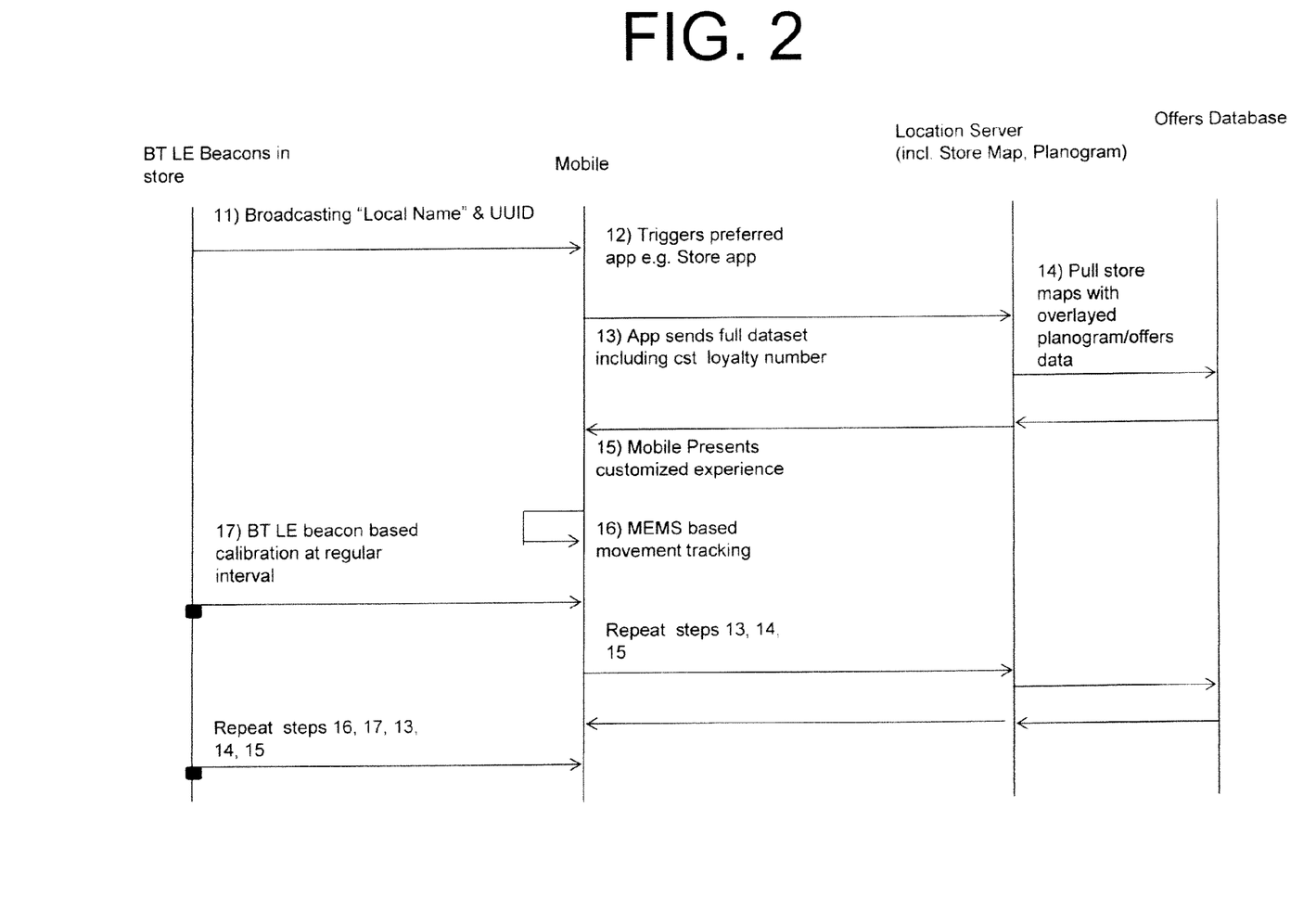
FIG. 2 is a flowchart of another exemplary method for presenting a customized communication experience in an establishment.

Reference now is made in detail to the examples illustrated in the accompanying drawings and discussed below. FIGS. 1 and 2 illustrate exemplary methods for enhanced interaction with a customer provided in response to or based on wireless signaling with a customer's mobile station (MS) to determine when the customer has entered a facility, such as a commercial enterprise and/or to provide location information as the user moves about the enterprise premises. The signaling, for example, may provide an identifier of the MS and/or the customer to a system of the commercial enterprise's proprietor. The signaling also enables location determination to facilitate presentation of a map, and possibly related information regarding location of the user within the premises, to allow personnel to pull-up account records or the like and interact more personally with a customer/user.

The first example of FIG. 1 relies on near field RF signals such as RFID query/scanner signals to enable the enterprise to detect entry of mobile station into the enterprise premises. In FIG. 1, when a mobile station passes by a certain location, such as an entrance to an enterprise, the mobile station receives a near field RF signal containing a request for an ID from an EAS in step 1. After receiving the request, the mobile station sends its ID back to the EAS in step 2. Upon receiving the ID, the EAS then forwards the ID of the mobile station to the CRM in step 3. The CRM then sends a push notification back to the mobile station to execute an application associated with the enterprise (step 4).

The application, once activated in the mobile station, requests map and offer information from the location server (steps 5, 6, 7). In particular, the location server receives the request from the mobile station (step 5), requests offer information for the mobile station from the offers database (step 6) and receives the offer information from the offers database (step 7). The application also starts tracking the movement of the mobile station, e.g., using MEMS that may be present in the device (step 8). At regular displacements (as detected by the mobile station) the mobile station requests map data from the location server to refresh the map on the mobile station with updated location and offer information. MEMS, because of inherent inaccuracy, however, will accumulate error in its location readout. It therefore may be desirable to provide calibration from time to time. As the location of the BT beacons are known to the location server, each BT beacon is able to serve as a reference point to recalibrate the MEMS (step 9). If more than one BT beacon is visible to the mobile station, the mobile station may send the list of BT beacons including their signal strength to the location server, which in turn is able to look up this data in an RF fingerprinting database to estimate the location of the mobile station and then provide this to the mobile station for recalibration of MEMS in the mobile station.

This cycle of movement tracking using MEMS, requesting information from the location and offers servers for updated information and recalibrating MEMS using BT beacons continues until the user is done using the application (e.g., either automatically by leaving the premises or manually turning off the application).

Another example of identifying a user walking into the premises is to configure the mobile station to invoke the merchant's application when the BT receiver in the mobile station detects a BT beacon with a specific Universally Unique Identifier (UUID) and name (steps 11 and 12). Specifically, an entry is provided in a register file associated with the BT receiver. This entry links the UUID/Name with merchant's application. The merchant has some or all of its stores use the same UUID or name so that the mobile station invokes the merchant's application no matter which store location the user goes to. In one example, the mobile station's interaction with the various backend servers (e.g., the location and offers servers) is subsequently the same as described with steps 5, 6, and 7.

In order to conserve battery life in the mobile station, its BT receiver can be made to operate in low energy (LE) scanning mode at times when not actively engaged in a BT communication. In this way, having the mobile station in the LE scanning mode may not significantly drain the mobile station battery as only a small amount of power is consumed in this mode by Bluetooth 4.0 (BT4.0) (compared to Bluetooth 3.0/2.2 modems).

Figure 3:
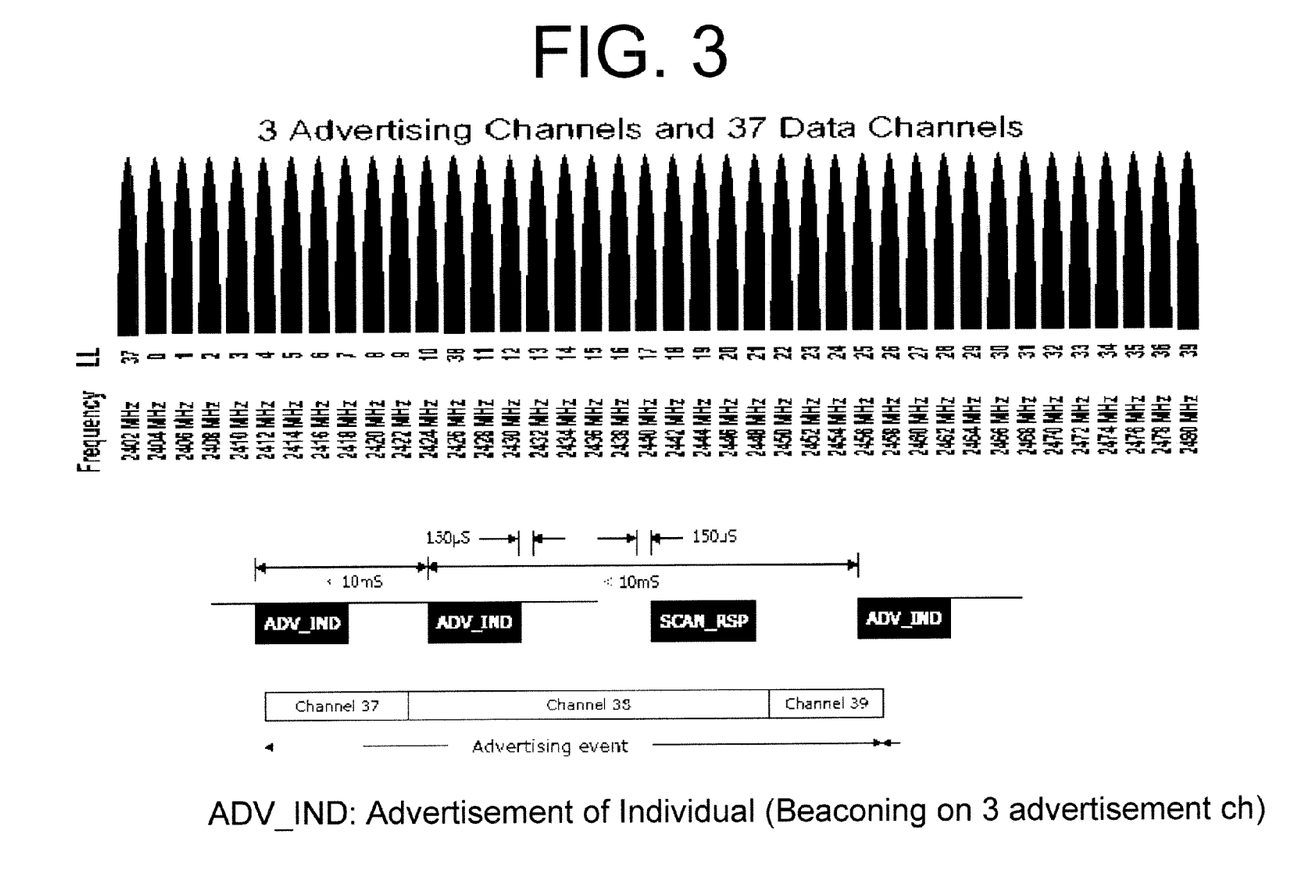
FIG. 3 is a chart of the channels used by Bluetooth® for broadcasting messages to mobile stations.

As per the BT standard, in the broadcasting mode, the BT radio of each beacon in the premises wakes up every 10 ms seconds and advertises the presence of the BT radio by sending "ADV_IND" message on different Advertisement channels. As shown in FIG. 3, the three Advertisement channels are set amongst 37 data channels in the 2402 to 2480 MHz range. Channels 37, 38 and 39 are assigned as the Advertising channels, and the beacon broadcast alternates between the Advertisement channels every 10 ms. Although specifically three Advertisement channels are shown, they are selected based on the BT standard. Other numbers of channels and separations may be used, e.g., if the standard changes.

The BT radio of the mobile station scans the channels until it receives a beacon signal on one of the advertisement channels. The mobile station may also measure the strength of the signals received from the identified BT beacon signals received on the advertisement channels. Signal strength information enables the location server to do more accurate triangulation and thereby provide more accurate reference location to recalibrate the MEMS.

The messaging sent from the mobile station may also communicate other information to the enterprise server computer system, such as the customer name, address, account identifier, customer loyalty number, etc. The communication of information associated with the customer using the mobile station to the enterprise server computer system, for example, may allow personnel of the enterprise at the premises that expect to interact with the customer while the customer is at the premises to pull up relevant information about the customer from the system to expedite and/or personalize the interaction with the customer.

The computer system of the enterprise may be a location server within the enterprise. Depending on the system configuration, the communications between the mobile station and computer system of the enterprise may use the BT or WiFi® access points within the premises and a local area network (LAN) or the like within the premises. Optionally, the location server may be located at a remote location, and communicate with the mobile station via an appropriate wide area network of the enterprise. As another alternative, the mobile station may send the information associated with the identifier(s) to the enterprise computer system via a cellular wireless transceiver and the public macro cellular communication network.

After receiving the identifier from the mobile station, the server application running on the computer system is triggered to access its internal database (not separately shown) of RF fingerprinting data with respect to points within the premises. Of course, the RF fingerprinting database could be external, depending on the size and complexity of the data versus the desired access speed. The RF fingerprinting database stores records for various points in the premises that indicate the particular set of beacon identifiers (UUIDs in the BT example) expected to be picked up by a mobile station at each respective location. For more accurate determinations, the database records may also indicate relative signal strengths of the beacon signals picked up at the respective locations within the premises. In this way, the records of the database effectively correlate combinations of the identifiers (and possibly signal strengths) to respective locations within the enterprise premises.

In response to the set of identifiers from the mobile station, the location server accesses its internal RF fingerprinting database to retrieve the record corresponding most closely to the received set of identifier and any associated signal strength information to determine a location of the mobile station within the premises. For example, the location server may do a database lookup to correlate or map a set of one or more received UUIDs to Lat/Long of the mobile station's position within the premises. In this way, the location server determines from the database the location of the mobile station within the premises, based on the received set of identifiers. The location server may contain one or more maps of the premises, and a planogram representation of products or services offered in the premises by the enterprise.

In our example, the location server communicates with another database (shown separately in the drawing) containing current sale offers regarding products or services offered by the enterprise in step 6. The second database may also include a variety of other information that correlates to position within the enterprise premises, such as maps of the premises, and/or a planogram representation as in the location server. This later database may be in the premises of the enterprise, and part of the same computer system as the location server. Optionally, the database could be located away from the premises.

In the process flow of FIG. 1, after receiving the communication from the mobile station and determining mobile station location, the location server passes the mobile station's Lat/long to the system or computer maintaining the database of location-related offers information. Based on the determined location, the database retrieves relevant map information and any related information, such as products, services or offer information available and relevant to the current location. The database returns the information to the location server, which then sends a message back to the mobile station in step 7. The information enables the mobile station to present a map of the premises showing the determined location of the mobile station within the premises and any other position related information that may have been obtained from the database. In this way, the customer may view the premises map and the mobile station's location in the premises of the enterprise. The presentation may also offer ancillary information from the database, for example, to enhance the marketing to the user. Examples of the ancillary information may include coupons or specials for items in the area where the mobile station is located, information about certain featured products, and the like. This ancillary information is thus local to the portion of the premises where the mobile station is located (changing as the customer moves within the premises) and is only available within the premises.

The presentation may be in the form of a text message, or a series of pictures accompanied by text. The presentation may also be scrollable or have hyperlinks associated with certain text to link to more information about the products presented. The presentation of the map may be in the form of a layout of the premises and an indication marker of where the mobile station is located. The map may be expandable to offer close up information of the premises In the discussion of this first example so far, the mobile station has detected entry and obtained position related information for presentation to the user. For example, the mobile station has presented a map of the premises showing an initial location of the mobile station within the premises. Steps such as 5 to 7 can be repeated from time to time while the user is within the premises to update the map to show updated location of the mobile station and to update any other related information presented to the user. The enterprise application may configure the mobile station to repeat these steps periodically, at some regular time interval, such as every 30 s or minute. Other parameters, however, could be used to trigger repetition, such as a change in the set of received beacon identifiers and/or changes in signal strength of some number of beacon signals, as an indication of significant movement of the mobile station within the premises. In addition, the location updating may be based on the location within the premises and/or corresponding products located there. The updating may also be dynamic, e.g., updating at a particular rate and slowing down or speeding up dependent on the amount of movement of the mobile station over several of the last updates.

To further refine the position tracking and related map presentation aspect of the user experience, the mobile station may be adapted to utilize its internal MEMS to detect movement of the mobile station and update the location as shown on the presentation of the map in response to movement of the mobile station detected by the MEMS, between updates based on capture of beacon signals. Updates based on capture of beacon signals may then effectively recalibrate the location determination and position related presentation. The user has the option of disabling the use by the mobile station of the BT beacons. In addition, if the user activates at BT headset (to make or receive calls) or medical or fitness equipment with integrated BT, the application can switch-over and invoke a compensation software program, running on the mobile station's processor that more precisely calculates the potential error in MEMS output due to temperature, pressure and humidity changes (assuming the mobile station has the sensors to track changes in temperature, pressure and humidity), and provide a more accurate reading.

FIG. 1 includes steps related to such use of MEMS. Hence, the enterprise application on the mobile station also keeps track of the movement of the mobile station with the use of MEMS based movement tracking system, in step 8. While the customer may navigate using MEMS with active calibration using BT, at the entrance of the premises it may be difficult to get a location fix using BT because of interference from beacons operating outside the premises, traffic, and drift if MEMS was used to navigate to the premises. An ISO15693 based check-in, as well as calibration helps alleviate this problem.

A proprietor can tell with a relatively high degree of certainty that a customer is at a particular entrance of the enterprise. The advantage of MEMS is that smart phones already have this capability built-in.

MEMS, however, has a high degree of drift and may require frequent recalibration. Based on current technology, MEMS require recalibration as follows: recalibration every 13-24 m for a desired location accuracy of 3-4 meters; recalibration every 8-11 m for a desired location accuracy of 2-3 meters; and recalibration every 5 m for a desired location accuracy of 1-2 meters.

One way to provide calibration for MEMS is using BT4.0. One advantage of BT4.0 is that it is relatively low cost and has a relatively long battery life, which keeps the maintenance cost relatively low. A BT4.0 network in the premises can be made robust by having the application on the mobile phone alert the premises (e.g., a maintenance department) when the mobile station doesn't receive a beacon where it is supposed to. For example, the mobile station may communicate with a location server which, on receiving a set of UUIDs, provides Lat/Long to the mobile station. If the location server does not receive a UUID of a beacon which is within a cluster of beacons for which it has received UUIDs, location server sends alert to system used by property management team to have the specific BT beacon serviced.

There are three methods of getting a location fix using BT4.0 for calibrating MEMS on the mobile station. A Geometric approach involves Tri-lateration using signals from at least 3 nodes providing BT4.0 beacons. An optional Geometric approach uses K-nearest neighbors, which is a fingerprinting based method. Another method of getting location fix is by using a statistical approach, in which gradient filtering of received signal strength indication (RSSI) measurements is used to estimate the distance from reference point. The method (or combination of methods) used may vary depending on the accuracy requirements and availability of signal strength data: K-nearest neighbors is the most accurate, whereas gradient filtering of RSSI is least accurate. An application (e.g., proprietor's application) can download an indoor map including the co-ordinates of the beacons installed. In one embodiment, the mobile station scans for BT4.0 beacons, notes the name/MAC address/RSSI and Link Quality parameters and performs ranging. If the mobile station knows the general vicinity, the mobile station can perform calibration with just 2 beacons.

In another exemplary method, the mobile station may be checked into different sections of the premises. The proprietors of the premises could then obtain information on how many customers go to a certain section as compared to another section of the enterprise, thereby gauging generally what item (or items) may be drawing the customers' interest. Promotions could then be evaluated and modified if an item is not drawing expected interest or if an item is receiving unexpected interest.

The other option for collecting proximity information is to have the BT transceivers in the premises operate in Server mode and mobile in the peripheral mode. The BT transceiver could then identify customers visiting different parts of the premises, assuming the mapping of address to the mobile directory number, MDN, is available.

In another embodiment, the position of the mobile station may be initially determined with the EAS at the beginning of a navigation operation. The EAS provides a position reference in order to give an absolute location of the mobile station when entering the enterprise. If a user of the mobile station accidently enters an incorrect destination and immediately (e.g. within a few seconds) enters a subsequent correct destination, upon reentering the correct destination the mobile station may use the previously determined position rather than re-determine the position using the EAS.

As stated above, the temperature sensor and barometer may be used to maintain accurate positioning of the mobile station in the premises rather than frequently recalibrating the MEMS. For example, measurements made by the temperature sensor may be used to calculate errors in MEMS measurements, thereby allowing the mobile to determine position accurately without involving recalibration with the MEMS. However, if the navigation operation is for an extended amount of time (e.g., over half an hour), the mobile station may perform a recalibration to assure the accuracy of the mobile station.

The example of FIG. 1 utilized the EAS system as may be found in a retail premises to enable the enterprise to detect entry into the enterprise's premises. Entry detection may be implemented in other ways, for example, via location detection using embedded capabilities of the mobile station. For example, the navigation application detects that it is in the vicinity of an enterprise (by setting up Geofence around enterprise's facilities) and invokes the enterprise's application on the mobile station. The enterprise's application in turn alerts the CRM system that it has entered a particular store and provides its loyalty number for enterprise's CRM to start interacting with the customer. Then, the enterprise application collects a full dataset including beacon identifiers and sends the dataset (step 4) and any other information about the beacons and/or the customer to the enterprise server system which implements the triangulation after step 5 in the process above. As discussed, the location server correlates UUID(s) to Lat/Long, and then passes the mobile station's Lat/long to another server with an Offers Database in step 5. The Offers Database passes back an indoor map and other relevant data to the location server, which sends that information to the mobile station to present a customized experience to the user within the application in step 6. The customized experience allows the user to navigate through the enterprise, receive specialized announcements concerning sales and items, etc. MEMS tracking, etc. enables presentation updating, as in the example of FIG. 1. The information is sent via the application to be reviewed in the mobile station.

In another example, a different method for alerting the mobile station upon entry into the enterprise is shown in FIG. 2. Step 11 is similar to step 3 in FIG. 1, in that, one or more short range beacon signals (e.g. BT signals in our examples) are broadcast in the premises and received/detected by the mobile station. However, in this example, instead of notifying the mobile station of entry via the EAS, the beacon broadcasting an identifier is detected by a short range wireless receiver inside the mobile station as the indication of entry of the mobile station into the premises.

The mobile station receives the identifier, which then triggers the mobile station to execute the enterprise application that corresponds to the identifier in step 12. The enterprise application enables the mobile station to collect the beacon identifier dataset (similar to step 3) and determine its current location enterprise application. The mobile station may also send information associated with a customer (e.g. loyalty number or the like), using the mobile station, to a system used by personnel of the enterprise at the premises as part of step 13. This additional information may be used by enterprise personnel during personal interaction with the customer.

The location server uses the beacon identifier dataset to determine position, e.g. Lat/Lon, of the mobile station within the premises; and the location server communicates with a database containing map information, etc. in step 14. The database forwards the information back to the location server. The location server in turn forwards the map and any other location-related information to the mobile station in step 15, for the presentation to the user as in the earlier examples. Steps 16 and 17 and the subsequent repetitions of earlier steps 13, 14 and 15 in the example of FIG. 2 relate to MEMS based tracking, BT-based recalibration and location updates, essentially corresponding to steps 8, 9, etc. in the example of FIG. 1.

Figure 4:
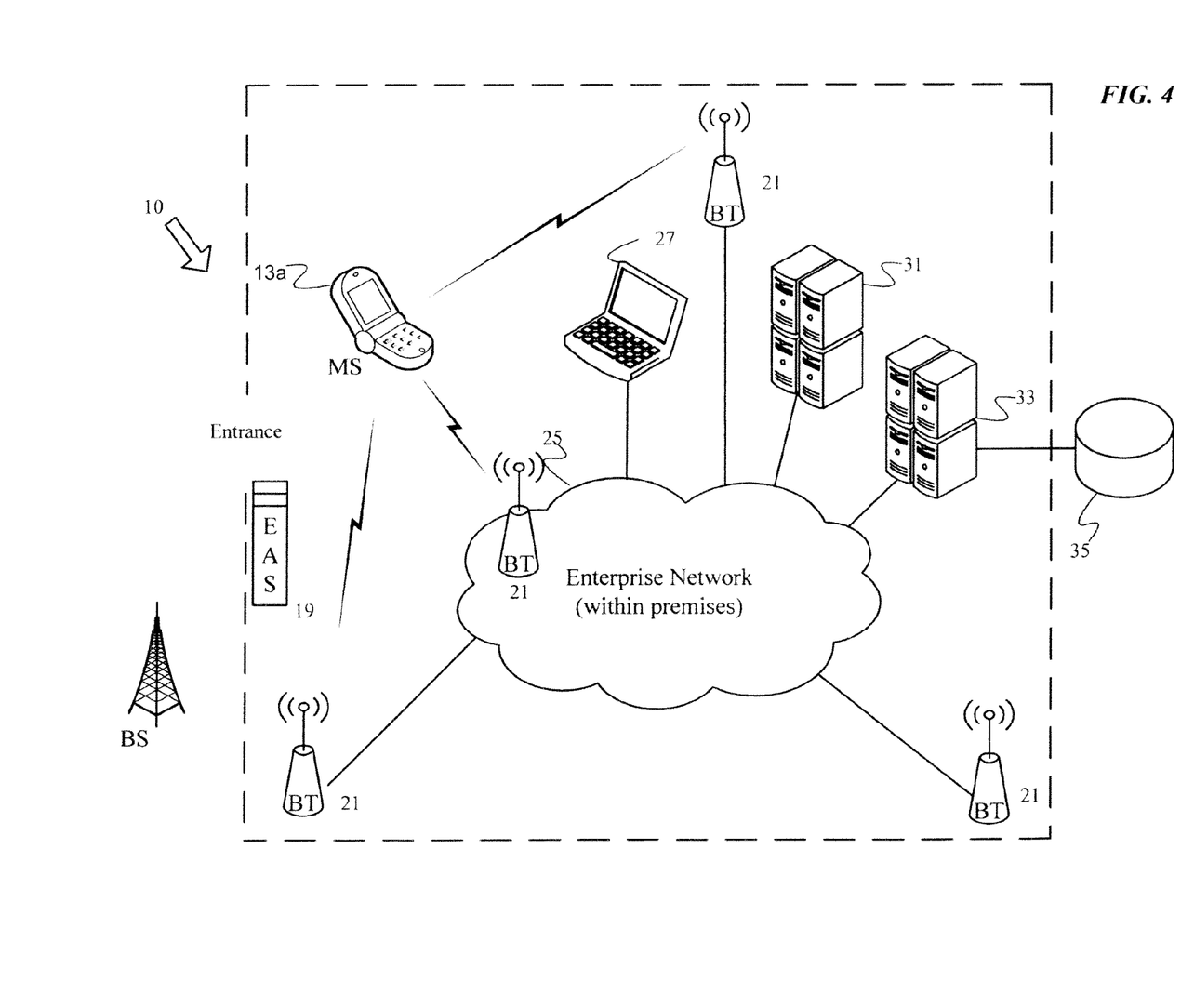
FIG. 4 is a high-level functional block diagram of an example of a system of networks/devices that provide various communications for mobile stations and support an example of the customized communication experience.

FIG. 4 illustrates a system used in the premises 10 of an establishment or enterprise showing communications for customer experience customization by mobile station users, such as one or more of the procedures outlined above relative to FIGS. 1-3.

The example shows one mobile station (MS) 13a for use in the premises 10, for convenience. The mobile station 13a is an example of a mobile station that may be used for the enhanced customer service experience. However, the network will provide similar communications for other similar users' mobile stations.

The mobile station 13a normally communicates via a public mobile communication network, represented generically by the antenna tower of one of the cellular base stations (BS). The public wireless mobile communication network 25 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, Long Term Evolution (LTE), or other standards used for public mobile wireless communications. The mobile station 13a will include one or more wireless transceivers configured to enable mobile communications via the public macro cellular communication network. The public network typically offers voice telephone communications as well as messaging and data services. The mobile station 13a at least detects certain wireless signals within the premises 10. The mobile station 13a communicates wirelessly with enterprise computer equipment, and as outlined earlier, that communication may use either the public macro network (e.g. via wireless link with base station BS) or may use wireless communications covered via the enterprise data network 25 within the premises. For example, the mobile station 13a is capable of data communications through the base station BS of the public network (and the user thereof typically will have subscribed to data service through the public mobile communication network).

Mobile station 13a can take the form of portable handsets, smart-phones or personal digital assistants, although they may be implemented in other forms. Program applications, including an application to assist in the enhanced customer experience service can be configured to execute on many different types of mobile stations, such as mobile station 13a.

In the example of FIG. 4, the premises 10 is that of a retail enterprise. For example, the enterprise has an EAS device 19 at or near an entrance, for example, for detecting RFID tags on goods being taken out of the premises 10 without proper purchase, as a detector of or deterrent to shoplifting. If operated in the manner discussed above relative to FIG. 1, the EAS 19 is also used in determining if a user having a mobile station 13a has entered the premises 10. The EAS 19 may be located at an entrance to the premises 10 as the user enters the premises 10 via the entrance.

In the example, the enterprise has a number of BT wireless transceivers 21 or access points within the premises. The BT transceivers 21 are positioned at known locations. Particularly, the BT transceivers 21 provide wireless communications within the premises 10, in addition to the beacon broadcast transmissions, and then the BT transceivers 21 connect to a communication network 25 that the enterprise operates within the premises 10. The network may be a wired or wireless local area network, and in the example, the network 25 provides data communication connectivity for a number of other enterprise systems or devices, shown by way of example as a PC or other terminal 27 (which may also be a mobile station) and two server computers (servers) 31 and 33.

For purposes of this example, the server 33 corresponds to the location server in the above examples and has access to one or more databases 35, for correlating identifier datasets to position and/or for the Store Map/Planogram/Offers information. In this example, the server 31 is a customer relationship management (CRM) server, which provides account-related services or the like to enterprise personnel using the terminal 27 to interact with the customer/user of the mobile station 13*a*. The communication of the mobile station upon entry into the premises 10 effectively 'checks-in' the user with the CRM server 31.

The BT transceivers 21 are located throughout the premises 10 to provide beacons that the mobile station 13*a* is able to capture and respond to, which allows the mobile station 13*a* and the enterprise system effectively monitor movement of the mobile station 13*a*, as in the example of FIG. 1. The transceivers 21 may use Bluetooth® technology for broadcasting signals on three advertising channels. Signals are broadcast every 10 milliseconds. A mobile station 13*a* maintained in Bluetooth LE mode is able to receive the signal broadcast from the BT transceivers 21.

A terminal 27 is used by the personnel of the enterprise to facilitate interaction with the customer while the customer is on the premises 10. The terminal 27 may receive information associated with the customer, obtained upon mobile station entry into the premises 10, so that enterprise personnel may offer specifically tailored information and notices for use with the customer.

As noted, the enhanced customer experience within the enterprise premises 10 may be implemented by appropriate configuration of any of a variety of different types of mobile stations. However, it may be helpful to consider and discuss an example of a mobile station.

Figure 5:
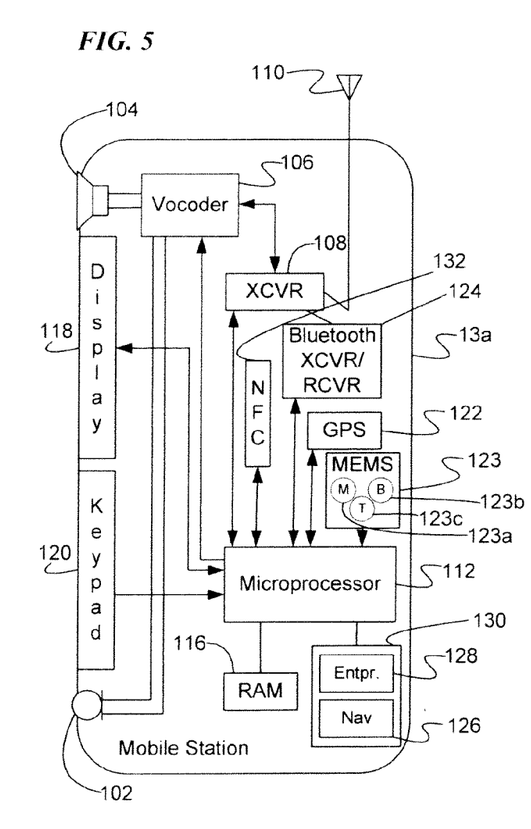
FIG. 5 is a high-level functional block diagram of an exemplary mobile station as may utilize the customized communication experience through a network/system like that shown in FIG. 4.

For purposes of such a discussion, FIG. 5 provides a block diagram illustration of an exemplary non-touch type mobile station 13*a*. Although the mobile station 13*a* may be a smartphone or may be incorporated into another device, such as a personal digital assistant (PDA) or the like, for discussion purposes, the illustration shows the mobile station 13*a* is in the form of a handset. The handset embodiment of the mobile station 13*a* functions as a normal digital wireless telephone station. For that function, the station 13*a* includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13*a* also includes at least one digital transceiver (XCVR) 108 configured to enable mobile communications via a public macro cellular communication network, for example, via the base station (BS) shown in FIG. 4. The mobile station 13*a* is configured for digital wireless communications using one or more of the common network technology types. The concepts discussed here encompass embodiments of the mobile station 13*a* utilizing any digital transceivers that conform to current or future developed digital wireless communication standards. The mobile station 13*a* may also be capable of analog operation via a legacy network technology.

The transceiver 108 provides two-way wireless communication of information, such as vocoded speech samples and/or digital information, in accordance with the technology of the network 25. The transceiver 108 also sends and receives a variety of signaling messages in support of the various voice and data services provided via the mobile station 13*a* and the communication network. Each transceiver 108 connects through RF send and receive amplifiers (not separately shown) to an antenna 110. The transceiver 108 may also support various types of mobile messaging services, such as short message service (SMS), enhanced messaging service (EMS) and/or multimedia messaging service (MMS). In most modern implementations of the mobile station 13*a*, one or more of the wireless transceiver 108 provides two-way wireless packet data communications via the public mobile communication network. The data communication capabilities of the transceiver 108 and the public network enable a wide range of packet-based communication services, such as browsing the World Wide Web, selecting and downloading multimedia content and/or application programs for the mobile station, email communications, etc.

Along with the transceiver 108, the mobile station 13*a* also includes a Bluetooth® transceiver 124. Although not separately shown, the BT transceiver 124 includes a receiver and a transmitter. For purposes of the enhanced customer experience, the receiver portion of transceiver 124 receives signals over BT channels such that the mobile station 13*a* can capture and process beacon identifiers as discussed in the process flow examples of FIGS. 1 and 2. Either within the premises or for other applications, the transmitter and receiver of BT transceiver 124 may allow the user to communicate with the BT devices like the BT transceivers 21 (in FIG. 4) when in or near the enterprise premises (assuming the BT devices are configured for two-way user communications).

The mobile station 13*a* includes a display 118 for displaying messages, menus or the like, call related information dialed by the user, calling party numbers, etc., including map and enterprise location for the customization service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a touchscreen, as in some types of smartphones.

In addition to normal telephone and data communication related input/output (including message input and message display functions), the user interface elements also may be used for display of menus and other information to the user and user input of selections, including any needed during the customization experience. For example, if used as map, the user may traverse the enterprise to find certain items, or be apprised of various sales.

A microprocessor 112 serves as a programmable controller for the mobile station 13*a*, in that it controls all operations of the mobile station 13*a* in accord with programming that it executes, for all normal operations, and for operations involved in the customization procedure under consideration here. In the example, the mobile station 13*a* includes a program memory 130 for containing the various applications used in the mobile station. For example, the program memory 130 of FIG. 4 includes an enterprise application 128, for retrieval and display of maps and product locations, and a navigation application 126 for general navigating purposes.

The mobile station 13*a* may also include a non-volatile random access memory (RAM) 116 for a working data processing memory. Of course, other storage devices or configurations may be added to or substituted for those in the example. In a present implementation, the navigation application 126 may use the MEMS system discussed above.

As outlined above, the mobile station 13*a* includes a processor 112, and programming stored in the program memory 130 including the enterprise application 128 and the navigation application 126 configures the processor 112 so that the mobile station 13a is capable of performing various desired functions, including in this case the functions involved in the technique for providing a enhanced customer experience.

In addition, the mobile station 13a includes a near field communication (NFC) radio frequency transceiver 132. Some modern mobile stations are already coming equipped with such NFC equipment, and increased NFC deployment is expected in the near future. The NFC transceiver 132 supports communications similar to RFID signals, in this case, for interacting with the EAS 19.

Near field communication is a technology allowing devices to establish radio communication when in close proximity to each other, for example, from an inch or so apart up to around ten feet or so apart. By comparison, Bluetooth is a short range wireless technology, for example, enabling communication between devices over distances of up to about 100 meters. The Bluetooth standard is IEEE 802.15.1-2002. WiFi, which has been widely adopted for wireless local area network communications, is another wireless technology of generally similar short range compared to public macro cellular communication network communications. Iterations of WiFi technology are defined under various parts of the IEEE 802.11 standard. Mobile and base station transceivers for public macro cellular communication network communications may support communications over ranges up to one or several miles.

The exemplary mobile station 13a also includes one or more MEMS 123. Such devices, for example, can perform compass functions and/or provide motion detection. In this case, the navigation application configures the mobile station 13a to update the user location on the map display in response to direction and amount of movement of the mobile station sensed by the MEMS 123.

The MEMS 123 may use a motion sensor 123a to detect motion of the mobile station 123. In other examples, the MEMS includes a barometer 123b to detect changes in pressure, which allows the mobile station to monitor changes in elevation. A temperature sensor 123c for detecting changes in temperature in the environment of the mobile station 13a may also be included in the MEMS 123.

The MEMS 123, which may include the motion sensor 123a, the barometer 123b and temperature sensor 123c may be coupled to the microprocessor 112 to calculate correction factors for navigation. The correction factors may be stored in one or more multi-dimensional tables or can be calculated directly from measurements by the various sensors in the MEMS 123. The degree to which the MEMS 123 is sensitive to temperature and pressure may depend on physical characteristics of the sensor. The sensitivity may be calculated by performing calibration.

In addition, the mobile station 13a may include a GPS receiver 122 for additional navigation functions. The GPS receiver 122 receives satellite signals which may be processed to determine the location of the mobile station 13a. GPS, for example, may be used to identify the location of the wireless device 13a in real time as the customer travels about. However, GPS satellites may not be receivable by the GPS receiver 122 when the mobile station is within some buildings. Hence, in the examples above, GPS may be used in or a part of the premises entry detection, but the beacon signals with RF fingerprinting and MEMS are used for dynamic location tracking within the premises 10.

The structure and operation of a mobile station, such as exemplary station 13a outlined above, were described to by way of example, only.

As shown by the above discussion, functions relating to an enhanced or customized customer experience, provided via a graphical user interface of a mobile station may be implemented on a mobile device and/or on computers connected for data communication via the components of a packet data network, operating as a location server and/or a database as shown in FIG. 4.

The structure of an exemplary mobile device has already been discussed relative to FIG. 5. The mobile station software functionalities involve programming, including executable code as well as associated stored data, e.g. files used for the customized user experience. The software code is executable by the processor of the mobile station, such as the microprocessor 112. In operation, the code is stored within the mobile station, e.g. in memory 130. At other times, however, the software may be stored at other locations and/or transported for loading into the mobile station. Execution of such code by a processor of the mobile station platform enables the mobile station to implement mobile station aspects of the methodology for the customized user experience in essentially the manner performed in the implementations discussed and illustrated herein.

Although special purpose devices may be used for the server computer system of the enterprise, such devices also may be implemented using one or more hardware platforms intended to represent a general class of data processing device commonly used to run "server" programming so as to implement the customer service functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the customization experience. The software code is executable by the general-purpose computer that functions as the location server. In operation, the code is stored within the general-purpose computer platform. At other times, however, the software may be stored at other locations and/or transported for loading into the appropriate general-purpose computer system. Execution of such code by a processor of the computer platform enables the platform to implement the server/database aspects of the methodology for customized user experience in essentially the manner performed by the server and/or database in the implementations discussed and illustrated herein.

Figure 6:
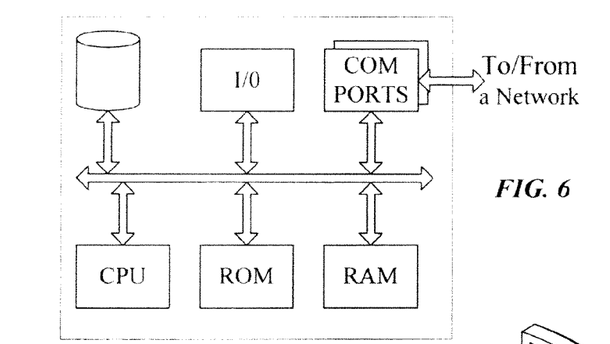
FIG. 6 is a simplified functional block diagram of a computer that may be configured as a host or server, for example, to function as the server in the system of FIG. 4.
Figure 7:
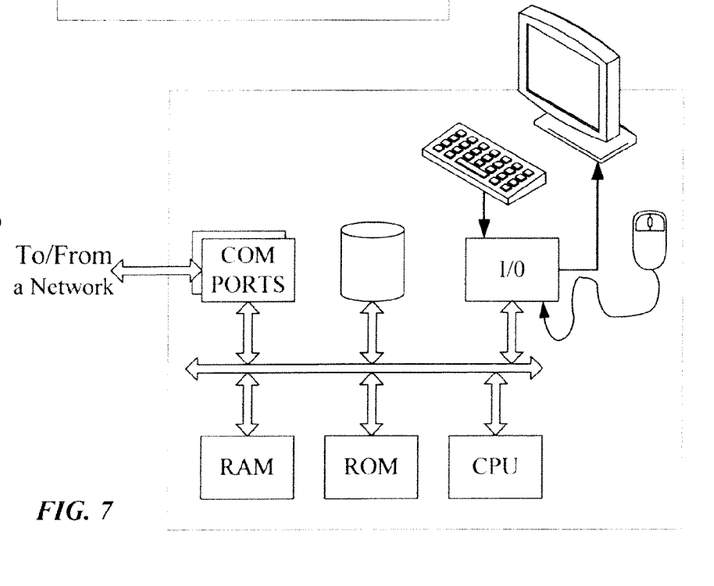
FIG. 7 is a simplified functional block diagram of a personal computer or other work station or terminal device.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 7). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of customer experience enhancement outlined above may be embodied in programming. Program aspects of the technology may be thought of as "products" or "articles of manufacture" typically in the form of executable code and/or associated data that is carried on or embodied in a non-transitory or other type of machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile station, comprising:
   a wireless transceiver configured to enable mobile communications via a public macro cellular communication network;
   at least one wireless receiver configured to receive wireless signals over a range less than a range of wireless signals from the public macro cellular communication network;
   at least one user interface element configured to provide an output to a user of the mobile station and receive an input from the user of the mobile station;
   a processor coupled to the wireless transceiver, the at least one wireless receiver and the at least one user interface element configured to control operations of the mobile station;
   a storage device accessible to the processor; and
   programming stored in the storage device, wherein execution of the programming by the processor configures the mobile station to perform functions, including functions to:
   (a) detect entry into premises of an enterprise in response to a signal corresponding to the enterprise received via the at least one wireless receiver;
   (b) detect one or more short range broadcast beacon signals received via the at least one wireless receiver from respective beacons and obtain an identifier from each received short range broadcast beacon signal;
   (c) send one or more identifiers identifying the respective beacons to a system of the enterprise for processing to determine a coordinate location of the mobile station within the premises, the coordinate location determined by correlating the one or more identifiers to one or more identifier records, an identifier record including a particular set of identifiers expected to be obtained by the mobile station at a particular coordinate location of the premises;

(d) receive information from the system of the enterprise, the information enabling the mobile station to present to the user of the mobile station via the at least one user interface element, a map of the premises showing the determined coordinate location of the mobile station within the premises; and (e) send information associated with the user of the mobile station to a system used by personnel of the enterprise at the premises in interacting with the user while the user is at the premises.

2. The mobile station of claim 1, wherein execution of the programming by the processor further configures the mobile station to send each identifier to the system of the enterprise via the wireless transceiver and the public macro cellular communication network.

3. The mobile station of claim 1, further comprising:
a short range wireless transmitter,
wherein execution of the programming by the processor further configures the mobile station to transmit within the premises each identifier over the air to a short range wireless receiver of the system of the enterprise at the premises via the short range wireless transmitter.

4. The mobile station of claim 1, wherein the at least one wireless receiver comprises:
a near field communication (NFC) receiver for receiving a radio-frequency identification (RFID) query signal corresponding to the enterprise from an Early Alert System (EAS) at an entrance to the premises; and
a short range receiver for receiving the short range broadcast beacon signals.

5. The mobile station of claim 1, wherein:
at least one wireless receiver comprises a short range receiver; and
execution of the programming by the processor further configures the mobile station to detect entry into the premises in response to one of the identifiers received in the short range broadcast beacon signals.

6. The mobile station of claim 1, wherein execution of the programming by the processor further configures the mobile station to:
periodically repeat functions (b)-(d) to update the map to show an updated location of the mobile station.

7. The mobile station of claim 6, further including:
one or more Micro Electromagnetic Systems (MEMS) responsive to movement of the mobile station;
wherein execution of the programming by the processor further configures the mobile station to update the location shown on the map in response to movement of the mobile station detected by the one or more MEMS, between repetitions of functions (b)-(d).

8. The mobile station of claim 7, wherein the one or more MEMS includes:
a barometer for measuring vertical movements for enabling vertical motion detection; and
a temperature sensor for measuring temperature changes for calculating error in MEMS measurements caused by temperature variation.

9. A mobile station, comprising:
a wireless transceiver configured to enable mobile communications via a public macro cellular communication network;
a short range wireless receiver;
at least one user interface element configured to provide an output to a user of the mobile station and receive an input from the user of the mobile station;

a processor coupled to the transceiver, the receiver and the at least one user interface element configured to control operations of the mobile station;
a storage device accessible to the processor; and
programming stored in the storage device, wherein execution of the programming by the processor configures the mobile station to perform functions, including functions to:
(a) detect a broadcast beacon signal received via the short range wireless receiver and obtain an identifier of a beacon from the broadcast beacon signal;
(b) determine whether the identifier corresponds to a proprietor of an enterprise;
(c) upon determining that the identifier corresponds to the proprietor of the enterprise, send the identifier of the beacon to a system of the enterprise for processing to determine a coordinate location of the mobile station and subsequently receive the determined coordinate location of the mobile station;
(d) determine whether the determined coordinate location of the mobile station corresponds to a premises of the enterprise; and
(e) upon determining that the determined coordinate location corresponds to a premises of the enterprise, send information associated with the user of the mobile station to a system used by personnel of the enterprise at the premises in interacting with the user while the user is at the premises.

10. The mobile station of claim 9, wherein execution of the programming by the processor further configures the mobile station to send the information associated with the user via the wireless transceiver and the public macro cellular communication network.

11. The mobile station of claim 9, further comprising:
a short range wireless transmitter,
wherein execution of the programming by the processor further configures the mobile station to send the information associated with the user via the short range wireless transmitter over the air within the premises to a short range wireless receiver of the system used by the personnel of the enterprise at the premises.

12. The mobile station of claim 9, wherein the programming comprises:
an application of the enterprise configured to execute upon determining that the identifier corresponds to the proprietor of the enterprise; and
a navigation application configured to determine the current location of the mobile station in response to execution of the application of the enterprise.

13. The mobile station of claim 9, wherein execution of the programming by the processor further configures the mobile station to:
(f) detect a plurality of broadcast beacons received via the short range wireless receiver and obtain an identifier from each of the received beacons;
(g) send the identifiers to a system of the enterprise for processing to determine the location of the mobile station within the premises; and
(h) receive and present to a user of the mobile station via the at least one user interface element a map of the premises showing the determined location of the mobile station within the premises.

14. The mobile station of claim 13, wherein execution of the programming by the processor further configures the mobile station to:
periodically repeat functions (f)-(h) to update the map to show an updated location of the mobile station.

15. The mobile station of claim 14, further including:
one or more Micro Electromagnetic Systems (MEMS) responsive to movement of the mobile station;
wherein execution of the programming by the processor further configures the mobile station to update the location shown on the map in response to movement of the mobile station detected by the one or more MEMS, between repetitions of functions (f)-(h).

16. The mobile station of claim 15, wherein the one or more MEMS includes:
a barometer for measuring vertical movements for enabling vertical motion detection; and
a temperature sensor for measuring temperature changes for calculating error in MEMS measurements caused by temperature variation.

17. The mobile station of claim 16, execution of the programming by the processor further configures the mobile station to:
determine, when navigation to a destination in the premises is initiated, an initial position using an Early Alert System (EAS), and
calculate error in MEMS measurements based upon the measurement of temperature changes by the temperature sensor, to maintain position accuracy during the navigation without subsequently determining the position of the mobile station using the EAS.

18. A system, comprising:
a plurality of short range wireless beacons, configured to emit beacon signals within an enterprise premises, each emitted beacon signal including an identifier associated with each beacon; and
a server computer system having access to a database and having a communication interface for communication with a mobile station at least while a user of the mobile station is within the enterprise premises,
wherein programming configures the server computer system to perform functions, including functions to:
(a) receive, from the mobile station, one or more identifiers identifying respective beacons to determine a coordinate location of the mobile station within the premises;
(b) determine from the identifiers the coordinate location of the mobile station within the premises, the coordinate location determined by correlating the one or more identifiers to one or more identifier records, an identifier record including a particular set of identifiers expected to be obtained by the mobile station at a particular coordinate location of the premises;
(c) send information to the mobile station, for presentation to the user of a map of the premises showing the determined coordinate location of the mobile station within the premises;
(d) receive information associated with the user of the mobile station for a system used by personnel of the enterprise at the premises in interacting with the user while the user is at the premises.

19. The system of claim 18, further comprising an Early Alert System (EAS) configured to:
emit a near field radio-frequency identification (RFID) query signal, corresponding to the enterprise, to the mobile station in a vicinity of an entrance to the premises, to request identification of the mobile station, and
to receive the identity of the mobile station in response to the request.

20. The system of claim 19, wherein the EAS is further configured to forward the identity of the mobile station to a customer relationship management server of the system.

21. The system of claim 18, wherein the programming configures the server computer system to further function to receive, from the mobile station, information associated with the user of the mobile station as a check-in with the enterprise, and to send the information of the user to personnel of the enterprise at the premises to enable the personnel to customize interactions with the user while the user is at the premises.

* * * * *